United States Patent
Heine

(10) Patent No.: US 9,655,374 B1
(45) Date of Patent: May 23, 2017

(54) PROCESS FOR MAKING A CHOCOLATE FOOD PRODUCT

(71) Applicant: Jonathan Heine, Tarzana, CA (US)

(72) Inventor: Jonathan Heine, Tarzana, CA (US)

(73) Assignee: URL IP HOLDINGS, LLC, Thousand Oaks, CA (US)

( * ) Notice: Subject to any disclaimer, the term of this patent is extended or adjusted under 35 U.S.C. 154(b) by 315 days.

(21) Appl. No.: 14/635,963

(22) Filed: Mar. 2, 2015

(51) Int. Cl.
*A23G 1/32* (2006.01)
*A23G 1/48* (2006.01)
*A23G 1/52* (2006.01)
*A23G 1/54* (2006.01)

(52) U.S. Cl.
CPC ............ *A23G 1/48* (2013.01); *A23G 1/52* (2013.01); *A23G 1/54* (2013.01); *A23G 1/32* (2013.01); *A23V 2002/00* (2013.01)

(58) Field of Classification Search
CPC .............. A23G 1/32; A23G 1/48; A23G 1/54
USPC ................................... 426/660, 659
See application file for complete search history.

(56) References Cited

U.S. PATENT DOCUMENTS

| | | | |
|---|---|---|---|
| 1,795,980 | A | 3/1931 | Wahl |
| 2,398,945 | A | 4/1946 | Lawton |
| 2,919,992 | A | 1/1960 | Gorman |
| 3,394,009 | A | 7/1968 | Knightly |
| 4,980,192 | A | 12/1990 | Finkel |
| 5,102,680 | A | 4/1992 | Glass |
| 5,804,243 | A | 9/1998 | Loh |
| 6,045,850 | A | 4/2000 | Kondou |
| 6,099,877 | A | 8/2000 | Schuppan |
| 6,299,916 | B1 | 10/2001 | Dally |
| 6,488,979 | B1 | 12/2002 | Davila |
| 6,841,186 | B2 | 1/2005 | Davila |
| 7,867,544 | B2 | 1/2011 | Buck |
| 8,685,482 | B2 | 4/2014 | Stratakis |
| 2002/0136814 | A1 | 9/2002 | Forneck |
| 2008/0026111 | A1* | 1/2008 | Bellody, Jr. ............. A23G 1/32 426/94 |
| 2009/0214741 | A1 | 8/2009 | Atapattu |
| 2010/0119652 | A1 | 5/2010 | Palav |
| 2014/0093637 | A1 | 4/2014 | Chang |
| 2014/0255581 | A1 | 9/2014 | Persinger |

FOREIGN PATENT DOCUMENTS

| | | |
|---|---|---|
| CN | 103609821 | 3/2014 |
| EP | 0815730 | 9/2002 |
| EP | 2442671 | 12/2010 |
| WO | 9412054 | 6/1994 |
| WO | 2013133903 | 9/2013 |
| WO | 2013173869 | 11/2013 |
| WO | 2014005243 | 1/2014 |

OTHER PUBLICATIONS

Walstad, Diana; Oven v. Steam-Baking of Cakes; article; Jul. 2013; http://dwalstad.files.wordpress.com/2013/07/oven-v-steam-wp__13a.pdf, pp. 1-2.

Camilla; Coconut Flour Choclate Cake; article; Nov. 7, 2014; http://powerhungry.com/2014/11/coconut-flour-chocolate-cake-gluten-free-grain-free/, pp. 1-12.

Lauren; Paleo Coconut Flour Brownies—Dense and Fudgy; article; Mar. 26, 2014; http://empoweredsustenance.com/coconut-flour-brownies-paleo/, pp. 1-64.

SteviaSmart.com; Glycerin product page; http://www.steviasmart.com/glfoga4obo.html, pp. 1-2 printed Mar. 10, 2015.

LYNTC10; Whipping egg whites to make lighter muffins/cake?; online forum; Feb. 4, 2010; http://chowhound.chow.com/topics/685683, pp. 1-3.

Mels; Substituting almond milk for cow's milk in baking?; online forum; Apr. 24, 2014; http://chowhound.chow.com/topics/973469, pp. 1-3.

Rimmer, Alyssa; Gluten-Free Chocolate Coconut Cake: Deep-Dark Deliciousness; article; Oct. 20, 2014; http://www.kingarthurflour.com/blog/2014/10/20/gluten-free-chocolate-coconut-cake/, pp. 1-14.

Dessert Chocolate Cake; Recipe; http://www.mccain.ca/en/products/dessert/cakes/deep-n-delicious-chocolate-cake, printed Mar. 10, 2015 pp. 1-6.

Michelle; Molten Chocolate Lava Cake; Recipe; Feb. 9, 2012 http://glutenfreefix.com/molten-chocolate-lava-cake/, pp. 1-5.

Kitchen Wisdom; Online Forum; http://www.nigella.com/kitchen-wisdom/baking/10, pp. 1-2 printed Mar. 10, 2015.

Grains and Flours for those with Gluten-Related Conditions; article; http://www.csaceliacs.org/grains_and_flours_glossary.jsp, printed Mar. 10, 2015 pp. 1-6.

Super Thick DIY Chocolate Almond Milk, online recipe; http://minimalistbaker.com/super-thick-diy-chocolate-almond-milk/, Jan. 2014 pp. 1-24.

Kayla Grossman; Simple Coconut Milk Chocolate Mouse: dairy free, paleo-friendly; article; http://blog.radiantlifecatalog.com/bid/71521/Simple-Coconut-Milk-Chocolate-Mousse-dairy-free-paleo-friendly, printed Mar. 10, 2015 pp. 1-18.

Aki Kamozawa; Pectin: Not Just for Jelly; Jul. 7, 2008; article; http://www.popsci.com/diy/article/2008-07/pectin-not-just-jelly, pp. 1-9.

David Szondy; Cadbury develops chocolate that won't melt at high temperatures; Dec. 2, 2012, article; http://www.gizmag.com/cadbury-heat-resistant-chocolate/25221/, pp. 1-7.

Sam Holder; Make chocolate with a high melting point?; Aug. 10, 2010; Online forum; http://cooking.stackexchange.com/questions/4750/make-chocolate-with-a-high-melting-point, p. 1.

Pectin; Encyclopedia entry; http://www.encyclopedia.com/topic/pectin.aspx, p. 1 printed Mar. 10, 2015.

(Continued)

*Primary Examiner* — Kelly Bekker

(74) *Attorney, Agent, or Firm* — Hankin Patent Law, APC; Kevin Schraven; Anooj Patel

(57) ABSTRACT

A chocolate food product that is low in fat, dairy free, soy and lecithin free, free of added sugar or ingredients that increase sugar content, starch-free, Isomaltooligosaccharide-free, oligosaccharide-free, maltitol-free, sorbitol-free, xylitol-free, erythritol-free, and isomalt-free. The chocolate food product may comprise: a cocoa butter, an unsweetened cocoa powder, a glycerin, a coconut cream, an almond milk, a pectin, a salt, a monk fruit blend, and a coconut flour.

11 Claims, No Drawings

(56) References Cited

OTHER PUBLICATIONS

Kristen Michaelis; Healthy Milk Substitutes With Recipes; article; http://www.foodrenegade.com/healthy-milk-substitutes-with-recipes/, printed Mar. 10, 2015 pp. 1-35.
Cathy Labash; Buster Love; Pinterest posting; https://www.pinterest.com/chocgal/buster-love/, pp. 1-3, printed Mar. 10, 2015.
Cristinas Ciarra; Bakin advice: Can I substitute coconut milk for regular milk in cake recipes; online forum; http://food52.com/hotline/18986-baking-advice-can-i-substitue-coconut-milk-for-regular-milk-in-cake-recipes, pp. 1-5 printed Mar. 10, 2015.
Stephanie Wong; What's the best dairy-free milk; Oct. 23, 2014; article; http://wakethewolves.com/whats-the-best-dairy-free-milk/, pp. 1-22.

\* cited by examiner

PROCESS FOR MAKING A CHOCOLATE FOOD PRODUCT

FIELD OF USE

This present disclosure relates generally to methods and processes for making chocolate food products. More particularly, the present disclosure relates to methods and processes for making low fat, sugar-free, starch-free, Isomaltooligosaccharide-free, oligosaccharide-free, maltitol-free, sorbitol-free, xylitol-free, erythritol-free, and isomalt-free chocolate food products that have high melting points.

BACKGROUND

Currently, commercially available chocolates and chocolate food products generally have a high sugar and fat content and very low melting points. Although the cocoa in chocolate has numerous health benefits, consumption of cocoa is problematic to many individuals, especially those suffering from diabetes (or pre-diabetics and other sugar and starch sensitive individuals), due to the sugars, fats, and starches present in most chocolate food products.

All chocolates are not created equal. While it is recommended that diabetics consume less chocolate that is high in simple sugars, diabetics may consume dark chocolate due to the high percentage weight of cocoa in dark chocolate. Conversely, chocolates such as white chocolate containing no cocoa which are higher in calories and saturated fat are not generally recommended to diabetics. In addition, consuming foods with both high sugar/starch and high fat content can be particularly deleterious to insulin/sugar sensitive persons, such as diabetics.

Despite the added benefits of cocoa and dark chocolate, most commercially available chocolate still remains high in sugar and fats. Although sugar substitutes have recently been used in some chocolate food products, these products typically contain additives such as starches, Isomaltooligosaccharides, oligosaccharides, maltitol, sorbitol, xylitol, erythritol, and/or isomalts. These additives are used to provide texture, sweetness, mouth-feel, and/or stability, but are undesirable and are sometimes even worse than the sugar and other ingredients that they replace, because of their impact on insulin levels over time and their impact on digestion (including increase gastroesophageal reflux disease, constipation, diarrhea, and other impacts).

Therefore, what is needed is a new and improved process for making a chocolate food product that is lower in fat, contains no added sugar, and uses additives and employees processes that are beneficial to those who are insulin resistant (e.g., diabetics), gluten sensitive, sugar sensitive, and may have digestive sensitivities. One of the food products is preferably, a chocolate cake product that has no starches, but still provides a cake-like texture with low amounts of carbohydrates.

SUMMARY OF EMBODIMENTS

To minimize the limitations in the prior art, and to minimize other limitations that will become apparent upon reading and understanding the present specification, the following discloses a new and improved chocolate food products and chocolate cake compositions that are starch-free, Isomaltooligosaccharide-free, oligosaccharide-free, maltitol-free, sorbitol-free, xylitol-free, erythritol-free, and isomalt-free.

One embodiment may be a chocolate food composition, comprising: a chocolate food product that is low in fat, dairy free, soy and lecithin free, free of added sugar or ingredients that increase sugar content, starch-free, Isomaltooligosaccharide-free, oligosaccharide-free, maltitol-free, sorbitol-free, xylitol-free, erythritol-free, and isomalt-free. The chocolate food product preferably has a melting point that is greater than 120° Fahrenheit. The chocolate food product preferably comprises monk fruit fiber and monk fruit extract and/or a stevia blend which melds in a way that is smooth to the taste with the flavor profile of chocolate. The chocolate food product does not have a bitter or off taste. The chocolate food product may consist essentially of: a cocoa butter; an unsweetened cocoa powder; a glycerin; a coconut cream; an almond milk; a pectin; a salt; a monk fruit blend; and a coconut flour. The cocoa butter may be about 6.0-10.0 wt %; the unsweetened cocoa powder may be about 10.0-18.0 wt %; the glycerin may be about 20.0-30.0 wt %; the coconut cream may be about 20.0-30.0 wt %; the almond milk may be about 20.0-35.0 wt %; the pectin may be about 0.5-3.0 wt %; the salt may be about 0-0.5 wt %; the monk fruit blend may be about 0-0.5 wt %; and the coconut flour may be about 1.0-3.0 wt %. The cocoa butter may be approximately 7.5 wt %; the unsweetened cocoa powder may be approximately 14.4 wt %; the glycerin may be approximately 23.3 wt %; the coconut cream may be approximately 26.2 wt %; the almond milk may be approximately 25.5 wt %; the pectin may be approximately 1.3 wt %; the salt may be approximately 0.01 wt %; the monk fruit blend may be approximately 0.1 wt %; and the coconut flour may be approximately 1.8 wt %. The chocolate food product may further comprise a vanilla flavoring. The pectin may be calcium activated. The monk fruit blend may comprise monk fruit fiber and monk fruit extract.

Another embodiment may be a process for making a chocolate food product, the steps comprising: providing a cocoa butter, an unsweetened cocoa powder, a glycerin, a coconut cream, an almond milk, a pectin, a salt, a monk fruit blend, and a coconut flour; mixing the monk fruit blend and the glycerine to create a glycerine mixture; mixing the cocoa powder and the salt to create a cocoa powder mixture; heating the coconut cream to approximately between 190° and 210° Fahrenheit; mixing the heated coconut cream and the pectin in a food processor, or other high speed blender to create a coconut milk mixture; mixing the glycerin mixture and the cocoa powder mixture to create a glycerin and cocoa mixture; adding a portion of the almond milk to the glycerin and cocoa mixture to create a glycerine, cocoa, and almond milk mixture; combining the glycerine, cocoa, and almond milk mixture and the unsweetened cocoa butter into a pan; heating the glycerine, cocoa, and almond milk mixture and the unsweetened cocoa butter at approximately between 125° and 135° Fahrenheit to create a heated cocoa mixture; stirring the heated cocoa mixture for approximately 5 minutes until the cocoa butter in the pan is liquefied; adding the coconut milk mixture to the heated cocoa mixture; adding a second portion of the almond milk to the heated cocoa mixture; sifting in the coconut flour to create a chocolate mixture; and heating and stirring the chocolate mixture at approximately 142° Fahrenheit and then to approximately 150° Fahrenheit to create a chocolate food product. The cocoa butter may be about 6.0-10.0 wt %; the unsweetened cocoa powder may be about 10.0-18.0 wt %; the glycerin may be about 20.0-30.0 wt %; the coconut cream may be about 20.0-30.0 wt %; the almond milk may be about 20.0-35.0 wt %; the pectin may be about 0.5-3.0 wt %; the salt may be about 0-0.5 wt %; the monk fruit blend may be about 0-0.5 wt %; and the coconut flour may be about 1.0-3.0 wt %. The cocoa butter may be approximately 7.5 wt %; the unsweetened cocoa powder may be approximately 14.4 wt %; the glycerin may be approximately 23.3 wt %; the coconut cream may be approximately 26.2 wt %; the almond milk may be approximately 25.5 wt %; the pectin may be approximately 1.3 wt %; the salt may be approximately 0.01 wt %; the monk fruit blend may be approximately 0.1 wt %; and the coconut flour may be approximately 1.8 wt %. The chocolate food product may further comprise a vanilla flavoring. The pectin may be calcium activated. The monk fruit blend may comprise a monk fruit fiber and monk fruit extract. The process for making a chocolate food product may further comprise the steps: adding the heated chocolate food product to a pastry bag; and piping the heated chocolate food product over a confection to be coated. The process for making a chocolate food product may further comprise the steps: pouring the heated chocolate food product on to a shallow pan to form a slab of chocolate; resting the slab for at least 1 hour at approximately between 55° to 58° Fahrenheit; refrigerating the slab for at least 2 hours to create a formed chocolate product. The process for making a chocolate food product may further comprise the steps: combining the formed chocolate product with a portion of hot water, a premelted second portion of the cocoa butter, a second portion of the monk fruit blend, a second portion of the coconut flour, a third portion of the almond milk, and a second portion of the glycerine to form a chocolate frosting mixture; and whipping the chocolate frosting mixture. The process for making a chocolate food product may further comprise the steps: portioning out the chocolate frosting mixture to form a low in fat, sugar-free, starch-free, Isomaltooligosaccharide-free, oligosaccharide-free, maltitol-free, sorbitol-free, xylitol-free, erythritol-free, and isomalt-free chocolate truffle. The process for making a chocolate food product may further comprise the step: rolling the chocolate truffle in a mixture of chopped nuts and a third portion of monk fruit blend.

It is an object to provide a method and process to make a chocolate food product for diabetics and other insulin resistant, gluten sensitive, and/or sugar sensitive people. The chocolate food product may also be directed to people who choose to live and maintain a healthy weight and low carbohydrate lifestyle. Preferably, the chocolate food product may be used as a glaze, icing, fudge, or truffle in food products.

It is an object to provide a method and process to make a chocolate food product that is lower in fat than commercially available chocolate.

It is an object to provide a method and process to make a chocolate food product that has no added sugars or sugar alcohols.

It is an object to provide a method and process to make a chocolate food product that is low glycemic and dairy free.

It is an object to provide a method and process to make a chocolate food product that has a melting point of over 130° Fahrenheit (F) and that will not melt or burn over temperatures over 300° Fahrenheit for exposures of less than five minutes.

It is an object to provide a method and process to make a chocolate food product that has a taste profile much smoother than other presently available low sugar or low fat chocolates.

It is an object to provide a method and process to make a chocolate food product that has no corn syrup, sugar, agave, or the like.

It is an object to provide a method and process to make a chocolate food product that comprises a unique combination of ingredients, including plant-based hardening agents, cocoa, and cocoa powder. The plant-based sweeteners are preferably low in oligosaccharides, thereby being beneficial to diabetics and others requiring low glucose level impacts.

It is an object to provide a method and process to make a chocolate food product with a chocolate flavor and texture by utilizing various high temperatures techniques while combining sweeteners, glycerine, vanilla flavoring, cocoa butter, and various gums. Preferably, the chocolate food product may be used as a dessert product or baked product.

It is an object to provide a method and process to make a chocolate food product that utilizes grinders and various baking techniques, rather than blending mixers. The baking formulation and process preferably reduces or even eliminates starch content while providing a cake-like texture with very low carbohydrates.

It is an object to provide a method and process to make a chocolate food product that may be used as a sweetener for baked goods, puddings, sauces, coffee, and the like.

It is an object to provide a method and process to create a chocolate food product that may be used as a desert and as a baked product.

It is an object to overcome the limitations of the prior art.

Additional embodiments will be understood from the detailed description below.

DETAILED DESCRIPTION OF ILLUSTRATIVE EMBODIMENTS

In the following detailed description numerous specific details are set forth in order to provide a thorough understanding of various aspects of one or more embodiments. However, the one or more embodiments may be practiced without some or all of these specific details. In other instances, well-known methods, procedures, and/or components have not been described in detail so as not to unnecessarily obscure aspects of the embodiments.

While multiple embodiments are disclosed, still other embodiments of the present disclosure will become apparent to those skilled in the art from the following detailed description. As will be realized, the embodiments are capable of modifications in various obvious aspects, all without departing from the spirit and scope of protection. Also, the reference or non-reference to a particular embodiment shall not be interpreted to limit the scope of protection.

DEFINITIONS

In the following description, certain terminology is used to describe certain features of one or more embodiments. For example, the term "cocoa butter" refers to vegetable fat extracted from the cocoa bean, which is generally used to make chocolate.

As used herein, the term "cocoa powder" refers to powder derived from cocoa beans that grow in pods on the cacao tree. The cocoa beans are generally fermented, dried, roasted and cracked. The nibs are generally grounded to extract about 75% of the cocoa butter, leaving a dark brown paste called chocolate liquor. After drying again, the mass is preferably ground into powder (unsweetened cocoa).

As used herein, the terms "glycerol", "glycerin", and "glycerine" refer to a neutral, sweet-tasting, colorless, thick liquid which freezes to a gummy paste and which generally has a high boiling point. Glycerin may be dissolved into water or alcohol, but generally not oils.

As used herein, the term "coconut cream" refers to an ingredient in cooking, having a mild non-sweet taste, similar to coconut milk but contains less water. The difference is mainly consistency, wherein the coconut cream generally has a thicker, more viscous consistency, whereas coconut milk is generally less viscous and thinner.

As used herein, the term "almond milk" refers to a beverage made from ground almonds, sometimes used as a substitute for dairy milk.

As used herein, the term "pectin" refers to a structural heteropolysaccharide or fiber found in fruits. Pectin is generally a gelling or thickening agent. Pectin may be used for high cholesterol, high triglycerides, and may be used for diabetes and gastroesophageal reflux disease (GERD). Calcium is often used to activate the pectin and cause it to thicken.

As used herein, the term "salt" refers to a crystalline compound NaCl that usually consists of sodium chloride. Salt is generally abundant in nature, and may be used especially to season or preserve food.

As used herein, the terms "monk fruit" or "monk fruit blend" refer to any ingredient that is grown on a vine known as siraitia grosvenorii and may be used a sweetener. Monk fruit extract may be combined with monk fruit fiber to form monk fruit blend.

As used herein, the term "coconut flour" refers to an alternative ingredient to wheat and other grain flours and is usually grounded from dried, defatted coconut meat. Preferably, coconut flour is high in fiber and low in digestible carbohydrates.

As used herein, the terms "approximately" and "about" generally refer to a deviance of within 5% of the indicated number or range of numbers. In one embodiment, the term "approximately" and "about", refer to a deviance of between 1-10% from the indicated number or range of numbers.

One embodiment is a high temperature chocolate food product that is low in fat, dairy free, soy and lecithin free, free of added sugar or ingredients that increase sugar content, starch-free, Isomaltooligosaccharide-free, oligosaccharide-free, maltitol-free, sorbitol-free, xylitol-free, erythritol-free, and isomalt-free. The melting point may be greater than 120° F. The chocolate product may have a high monk fruit fiber content. The chocolate product preferably combines cocoa and monk fruit with minimized or even eliminated bitterness or off taste.

The low fat, sugar(s) free chocolate food product is generally not only stable at room temperatures, but is also stable in an oven, such as a toaster oven, for at least five minutes, without running, melting, or burning. One embodiment of the chocolate food product may use a sweetening system that includes monk fruit, monk fruit fiber, and glycerin. The chocolate food product may be used as a glaze, icing, fudge, truffle, or the like. The chocolate food product is preferably dairy free, lecithin free, and gluten free.

Table 1 shows the preferred ingredients of one embodiment of the high temperature chocolate product.

TABLE 1

| Ingredient | % wt/wt (wt %) | % wt/wt range (wt % range) | Purpose |
| --- | --- | --- | --- |
| Cocoa butter | 7.5 | 6.0-10.0 | Primary lipid/Mouth-feel/Texture |
| Unsweetened cocoa powder | 14.4 | 10.0-18.0 | Primary ingredient |
| Glycerin | 23.3 | 20.0-30.0 | Sweetener/Flavor/Texture |
| Coconut cream | 26.2 | 20.0-30.0 | Binder/Texture/Liquid/Flavor |
| Almond milk | 25.5 | 20.0-35.0 | Binder/Texture/Liquid/Flavor |
| Pectin, Calcium activated | 1.3 | 0.5-3.0 | Thickener |

TABLE 1-continued

| Ingredient | % wt/wt (wt %) | % wt/wt range (wt % range) | Purpose |
| --- | --- | --- | --- |
| Salt | 0.01 | 0-0.5 | Sodium/Flavor |
| Monk Fruit | 0.1 | 0-0.5 | Sweetener |
| Coconut flour | 1.8 | 1.0-3.0 | Structure/texture |

In one embodiment, a batch of the chocolate food product may comprise: between approximately 4 to 6 oz. of cocoa butter; approximately 2 to 4 cups of unsweetened cocoa powder; approximately 1 to 2 cups of glycerin, of which 0-40% may be vanilla flavored (preferably natural vanilla flavoring made with real vanilla bean) glycerin; approximately 1-3 cups of coconut cream; approximately 1-3 cups of almond milk; approximately 2-4 tablespoons (T) of pectin, calcium activated; approximately 0-1 teaspoons (t) of salt; approximately ¼ to 1 teaspoons of monk fruit blend (preferably 12.5% mongrocides; includes monk fruit fiber); and approximately 0-1 cups of coconut flour.

In one embodiment, the chocolate food product may be produced by the following steps:
Combine monk fruit blend and glycerine, set aside
Combine cocoa powder and salt, set aside
Heat coconut cream to approximately 200° F.
   Pour ½ into food processor (or other high speed blender)
   Add pectin
   Mix
   Add rest of coconut cream into food processor (or other high speed blender)
   Mix
Add glycerin mixture to cocoa powder mixture
   Mix, and add 1½ cups of almond milk
In a pot, add glycerin-cocoa-almond milk mixture and cocoa butter
   Heat at low/simmer setting (128°-130° F.)
   Stir until cocoa butter is liquefied, about 5 minutes
   slowly pour in coconut cream mixture, while stirring
   Add last ½ cups of almond milk
   Sift in coconut flour
   Bring to approximately 142° F., continue stirring
   Slowly and carefully bring to 150° F., continue stirring
   Hold mixture at 150° F. for approximately 3 minutes, stirring briskly
The chocolate food product is generally ready and may be used as a glaze (e.g., by adding it to pastry bag and pipe over another food product, or by forming truffles in molds).

The chocolate food product may be formed into a frosting or fudge by the following steps:
   Pour out the mixture as a slab on a pan
   Sit for several hours at 55°-58° F. cold room
   Refrigerate for two hours
   48 oz of the cooled chocolate food product are placed in a bowl
   Add ½-1 cup of hot water
   Add 3 oz. premelted cocoa butter
   Add ⅛ t monk fruit
   Add 2 T coconut flour
   2 T Almond Milk
   ½ t glycerine (with or without vanilla)
   Whip
      Use as frosting and pipe through a pastry bag
      Scoop to make fudge-like balls
         Roll the balls in crushed almonds and Monk Fruit
In a preferred embodiment, a single batch of the chocolate food product may comprise: approximately 5 oz. of cocoa butter; approximately 3 cups of unsweetened cocoa powder; approximately 1.5 cups of glycerin, of which 0-25% may be vanilla flavored glycerin; approximately 2 cups of coconut cream; approximately 2 cups of almond milk; approximately 3 T of pectin, calcium activated; approximately ¼ teaspoons of salt; approximately ½ teaspoons of monk fruit blend (preferably 12.55 mongrocides; includes monk fruit fiber); and approximately ¼ cups of coconut flour.

The almond milk and coconut cream may be substituted for each other depending upon taste. In addition, the almond milk may be substituted with other nut or seed milks, including, but not limited to: coconut milk, cashew milk, cashew cream, hemp milk, hemp cream, chia milk, or chia cream.

Another embodiment may be a chocolate cake product. The chocolate cake product may comprise no grains or starches, preferably has a consistency similar to cake, is preferably low in calories, and is preferably free of sugars, sugar alcohols, starch, and gluten.

Table 2 shows the preferred ingredients of one embodiment of the chocolate cake product.

TABLE 2

| Ingredient | % wt/wt (wt %) | % wt/wt range (wt % range) | Purpose |
| --- | --- | --- | --- |
| Grape Seed Oil | 1.7 | 0-3.0 | Primary lipid |
| Unsweetened cocoa powder | 10.1 | 5.0-12.0 | Primary ingredient |
| Glycerin | 26.2 | 20.0-30.0 | Sweetener/Flavor/Texture |
| Almond milk | 3.6 | 0-6.0 | Binder/Texture/Liquid/Flavor |
| Salt | 0.01 | 0-0.3 | Sodium/Flavor |
| Monk Fruit | 0.3 | 0-0.1 | Sweetener |
| Coconut flour | 4.7 | 2.0-8.0 | Structure/texture |
| Baking Powder | 0.2 | 0-0.5 | Leavening Agent |
| Eggs | 53.0 | 40.0-70.0 | Whites - Leavening Agent Yolks - Binder/Texture |
| Cream of Tartar | 0.1 | 0-0.3 | Egg White stiffening agent |

In one embodiment, a batch of the chocolate food product may comprise: approximately 1-3 cups unsweetened cocoa powder; 1-3 cups glycerin, may be slightly (2-3%) flavored with vanilla; ¼ to 1 cup vanilla in glycerin; ⅛ to 2 cups almond milk; ¼ to 1 t salt; ¼ to 1 t monk fruit blend (preferably 12.5% mongrocides; includes monk fruit fiber); ½ to 2 cups coconut flour; ½ to 2 t baking powder; 12-36 eggs—separated; pinch of cream of tartar; 1-3 T grape seed oil.

In a preferred embodiment, a batch of the chocolate food product may comprise: approximately 2 cups unsweetened cocoa powder; 2 cups glycerin, may be slightly (2-3%) flavored with vanilla; ½ cup vanilla in glycerin; ⅜ cups almond milk; ½ t salt; ½ t monk fruit blend (preferably 12.5% mongrocides; includes monk fruit fiber); 1 cup coconut flour; 1 t baking powder; 24 egg—separated; pinch of cream of tartar; 2 T grape seed oil.

In one embodiment, the chocolate food product may be produced by the following steps:
Preheat oven (no steam) 350° F.
Combine monk fruit blend and glycerine
Combine cocoa powder and salt, mix
Combine egg yolks and grape seed oil
Whip egg whites with cream of tartar—soft peaks
Add glycerin to cocoa powder
Mix by hand
Add egg yolks
Add almond milk
Sift in an additional 2 T of cocoa powder
Mix by hand
Fold in egg whites
Pour into mold, pan, or cupcake molds
Switch Oven to Steam mode and bake in steam oven for 4 to 6 minutes.

When the chocolate food cake cools, the resulting confection preferably has a consistency of cake, but without any sugars, dairy, or starches.

The almond milk and coconut cream may be substituted for each other depending upon taste. In addition, the almond milk and/or coconut cream may be substituted with other nut or seed milks, including, but not limited to: coconut milk, cashew milk, cashew cream, hemp milk, hemp cream, chia milk, or chia cream.

While the foregoing written description enables one of ordinary skill to make and use what is considered presently to be the best mode thereof, those of ordinary skill will understand and appreciate the existence of variations, combinations, and equivalents of the specific embodiment, method, and examples herein. This disclosure should therefore not be limited by the above described embodiment, method, and examples, but by all embodiments and methods within the scope and spirit of the disclosure as claimed.

The foregoing description of the preferred embodiment has been presented for the purposes of illustration and description. While multiple embodiments are disclosed, still other embodiments will become apparent to those skilled in the art from the above detailed description, which shows and describes illustrative embodiments. As will be realized, the embodiments are capable of modifications in various obvious aspects, all without departing from the spirit and scope. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope. It is intended that the scope not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A process for making a chocolate food product, the steps comprising:
   providing a cocoa butter, an unsweetened cocoa powder, a glycerin, a coconut cream, an almond milk, a pectin, a salt, a monk fruit blend, and a coconut flour;
   (a) mixing said monk fruit blend and said glycerin to create a glycerin mixture;
   (b) mixing said cocoa powder and said salt to create a cocoa powder mixture;
   (c) mixing said glycerin mixture and said cocoa powder mixture to create a glycerin and cocoa mixture;
   (d) adding a portion of said almond milk to said glycerin and cocoa mixture to create a glycerine, cocoa, and almond milk mixture;
   (e) combining said glycerine, cocoa, and almond milk mixture and said cocoa butter into a pan;
   (f) heating said glycerine, cocoa, and almond milk mixture and said cocoa butter at approximately between 125° and 135° Fahrenheit to create a heated cocoa mixture;

(g) stirring said heated cocoa mixture for approximately 5 minutes until said cocoa butter in said pan is liquefied;

(h) heating said coconut cream to approximately between 190° and 210° Fahrenheit;

(i) mixing said heated coconut cream and said pectin in a food processor to create a coconut milk mixture;

(j) adding said coconut milk mixture to said heated and stirred cocoa mixture;

(k) adding a second portion of said almond milk to said heated and stirred cocoa mixture;

(l) sifting in said coconut flour to create a chocolate mixture; and (m) heating and stirring said chocolate mixture at approximately 142° Fahrenheit and then to approximately 150° Fahrenheit to create a chocolate food product.

2. The process for making a chocolate food product of claim 1, wherein said cocoa butter is about 6.0-10.0 wt % by weight of said chocolate food product;

wherein said unsweetened cocoa powder is about 10.0-18.0 wt % by weight of said chocolate food product;

wherein said glycerin is about 20.0-30.0 wt % by weight of said chocolate food product;

wherein said coconut cream is about 20.0-30.0 wt % by weight of said chocolate food product;

wherein said almond milk is about 20.0-35.0 wt % by weight of said chocolate food product;

wherein said pectin is about 0.5-3.0 wt % by weight of said chocolate food product;

wherein said salt is about 0-0.5 wt % by weight of said chocolate food product;

wherein said monk fruit blend is about 0-0.5 wt % by weight of said chocolate food product; and wherein said coconut flour is about 1.0-3.0 wt % by weight of said chocolate food product.

3. The process for making a chocolate food product of claim 2, wherein said cocoa butter is approximately 7.5 wt % by weight of said chocolate food product;

wherein said unsweetened cocoa powder is approximately 14.4 wt % by weight of said chocolate food product;

wherein said glycerin is approximately 23.3 wt % by weight of said chocolate food product;

wherein said coconut cream is approximately 26.2 wt % by weight of said chocolate food product;

wherein said almond milk is approximately 25.5 wt % by weight of said chocolate food product;

wherein said pectin is approximately 1.3 wt % by weight of said chocolate food product;

wherein said salt is approximately 0.01 wt % by weight of said chocolate food product;

wherein said monk fruit blend is approximately 0.1 wt % by weight of said chocolate food product; and wherein said coconut flour is approximately 1.8 wt % by weight of said chocolate food product.

4. The process for making a chocolate food product of claim 1, wherein said chocolate food product further comprises a vanilla flavoring.

5. The process for making a chocolate food product of claim 1, wherein said pectin is calcium activated.

6. The process for making a chocolate food product of claim 1, wherein said monk fruit blend comprises a monk fruit fiber and a monk fruit extract.

7. The process for making a chocolate food product of claim 1, further comprising the steps:

adding said heated chocolate food product to a pastry bag; and piping said heated chocolate food product over a confection to be coated.

8. The process for making a chocolate food product of claim 1, further comprising the steps:

pouring said heated chocolate food product on to a pan to form a slab of chocolate;

resting said slab for at least 1 hour at approximately between 55° to 58° Fahrenheit;

refrigerating said slab for at least 2 hours to create a formed chocolate product.

9. The process for making a chocolate food product of claim 8, further comprising the steps:

combining said formed chocolate product with a portion of hot water, a premelted second portion of said cocoa butter, a second portion of said monk fruit blend, a second portion of said coconut flour, a third portion of said almond milk, and a second portion of said glycerin to form a chocolate frosting mixture; and whipping said chocolate frosting mixture.

10. The process for making a chocolate food product of claim 9, further comprising the step:

portioning out said chocolate frosting mixture to form a chocolate truffle.

11. The process for making a chocolate food product of claim 10, further comprising the step:

rolling said chocolate truffle in a mixture of chopped nuts and a third portion of said monk fruit blend.

* * * * *